United States Patent
Brenner et al.

(10) Patent No.: US 6,378,111 B1
(45) Date of Patent: Apr. 23, 2002

(54) METHOD FOR MANAGEMENT AND DOCUMENTATION OF CONTACT POINTS OF A WIRING NETWORK

(76) Inventors: Wolfgang Brenner, Moosstr. 35, 82223 Eichenau; Cornelius Cremer, Kornblumenweg 12, 85586 Poing, both of (DE)

( * ) Notice: Subject to any disclaimer, the term of this patent is extended or adjusted under 35 U.S.C. 154(b) by 0 days.

(21) Appl. No.: 09/177,362

(22) Filed: Oct. 23, 1998

(30) Foreign Application Priority Data

Nov. 11, 1997 (DE) .......................................... 197 49 929

(51) Int. Cl.[7] ............................................. G06F 17/50
(52) U.S. Cl. ......................................................... 716/5
(58) Field of Search ............................................. 716/5

(56) References Cited

U.S. PATENT DOCUMENTS

| | | | |
|---|---|---|---|
| 3,705,349 A | * 12/1972 | Arnold | 324/512 |
| 3,742,414 A | * 6/1973 | Gittin et al. | 337/206 |
| 5,295,081 A | * 3/1994 | Habra | 364/489 |
| 5,861,664 A | * 1/1999 | Inoue | 257/697 |
| 5,883,814 A | * 3/1999 | Luk et al. | 395/500.09 |
| 5,980,093 A | * 11/1999 | Jones et al. | 364/489 |

FOREIGN PATENT DOCUMENTS

DE  43 33 121 C2  5/1994

* cited by examiner

*Primary Examiner*—Krisna Lim

(57) ABSTRACT

The method manages and documents contact points of a wiring network in an electric branching apparatus in an automatic manner using electronic information units with storage units that are inserted at the contact points of the wiring network. The stored data is detected by a computer and is compiled into a wiring plan.

20 Claims, 3 Drawing Sheets

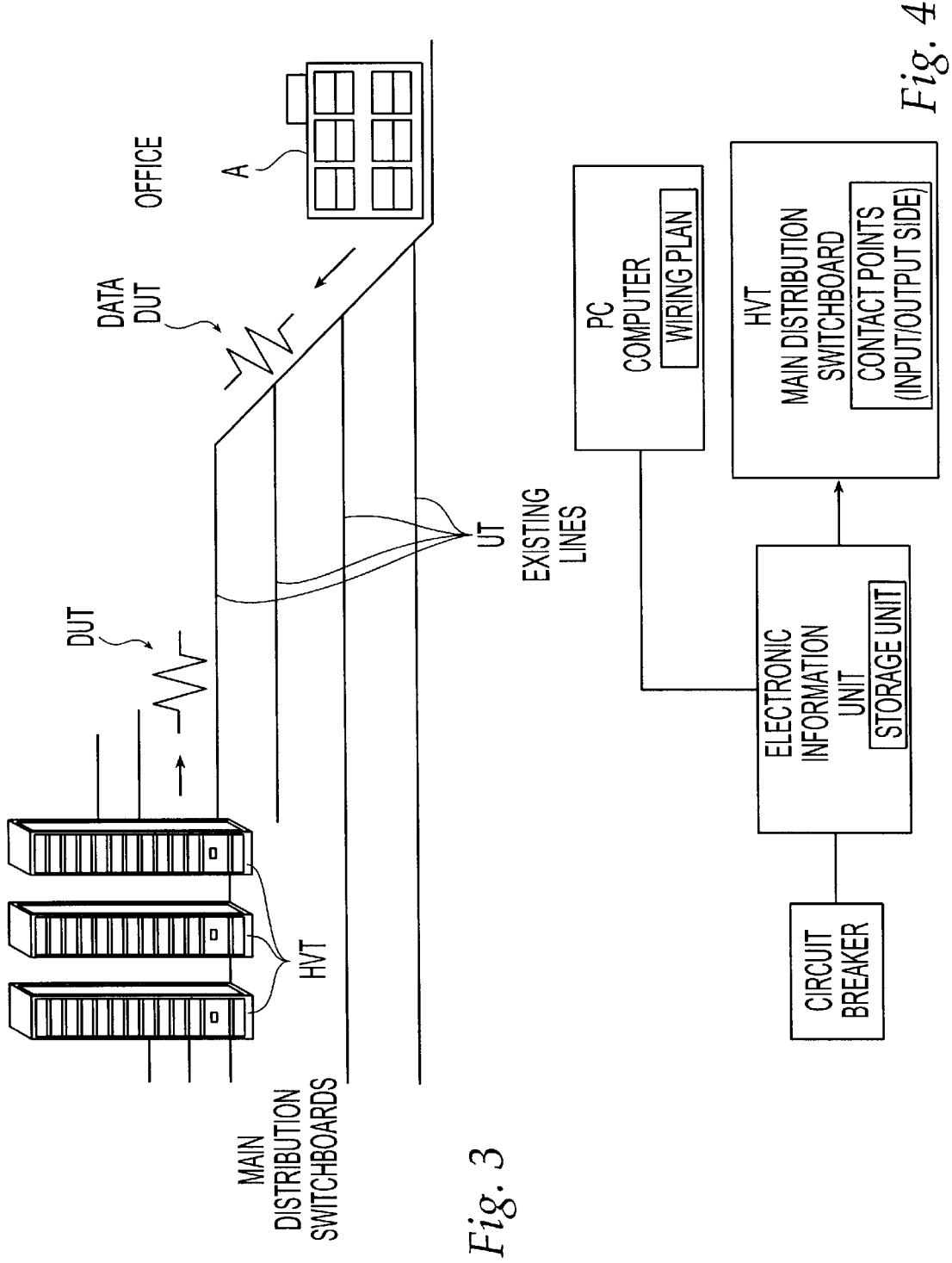

** METHOD FOR MANAGEMENT AND DOCUMENTATION OF CONTACT POINTS OF A WIRING NETWORK

BACKGROUND OF THE INVENTION

1. Field of the Invention

The present invention concerns management and documentation of contact points of a wiring network in an electrical branch apparatus.

2. Description of the Related Art

German reference DE 43 33 121-C3 teaches a localizing means with a magnetometer with which elongated objects hidden in the ground can be located. To this end detectable transmitter elements which are detected with the aid of a corresponding receiver are arranged at the elongated object (e.g., at a cable) or along this object. On the basis of these data the characteristic of the elongated object can be obtained and documented. Electronic components in a chip can also be realized as transmitting elements therein, this chip containing not only active electronic components but also storage means.

SUMMARY OF THE INVENTION

The present invention is based on the object of creating a method by means of which a wiring network of an electrical branch apparatus can be created in a simple, safe manner with low time outlay. The stated object is achieved with a method of the abovementioned type in that electronic information units with storage units are inserted at the contact points of the wiring network, that retrievable information necessary for the creation of a wiring plan are inputted into the electronic information units, that the electronic information units are detected by address by means of a computer, that a wiring plan is subsequently created with the obtained information, and that the inputs and outputs of a connection are documented and stored as retrievable data in the electronic information units.

With the aid of the inventive method it is thus possible to develop a simple and secure management along with the operation of distributor racks in wiring networks. It is particularly advantageous therein that even in very large branch apparatuses such as main distribution switchboards (HVT) of communication transmission networks the wiring plans with the input and output points can be documented and updated at any time by means of simple electronic access. This is a particularly significant factor, because only an errorless and constantly updated data stock guarantees a perfect operation even if problems should arise in the wiring network. Currently, mere lists about connections of the communication cable pairs at the system and subscriber sides are created. The accuracy therein always depends on the maintenance of these lists. According to the present invention a wiring plan can be automatically created by means of extraction of data stored in electronic information units at the contact points. The electronic information units are "intelligent" contact points in the form of electronic components in what are known as chips, these being addressable from a computer. The required information exchange therein ensues. In a distributor of a communications network at least the input pairs on the transmitter side and the output pairs on the subscriber side are then addressable. The respectively connected pairs are thus documented. An errorless wiring plan can thus be created and can remain updated by the inquiry of all contact points of the input and output side.

The power supply of the electronic information units (chips) can therein potentially occur via the two-wire network. The electronic information units are appropriately protected by circuit-breakers from voltage and current surges which can be induced given lightning, for example, so that the functioning of the communication network is not compromised.

Besides the electronic information units, other embodiments of contact points such as plugs that are plugged onto the contact points are also inventively utilized in such an "intelligent" wiring network. Multiple plugs are also provided to this end, so that an entire switching strip is contacted at once.

According to the present invention, the contactless interrogation can utilize radio or infrared transmitters.

Furthermore, an access is also possible from the location with master station, e.g., from a switching office, whereby the signals are inputted via the two-wire system. A separation of the signals from the normal communication transmission is therein executed by means of suitable modulation. These data communications can also take place if there is no traffic running on the two-wire connection, for example. In such a version the "intelligent" branch apparatus, or respectively, the distributor is also simultaneously a part of an "intelligent" network, in that can also extend via a main distribution switchboard (HVC) to further splitters, distributors, and other equipment of the terminal subscriber.

In the arrangement for carrying out the inventive method there must be corresponding communication between the electronic information units of the input and output sides, so that the respectively valid address of the neighboring electronic information unit is always updated. Such a communication respectively ensues via the two-wire network, whereby the signals for this communication are always separate from the normal information traffic signals. For example, a frequency range below 10 Hertz (Hz), not used for data, speech, and service traffic until now, can be used for such a communication.

In these arrangements the electronic information units take over, among others, the functions for an error localization of a potentially disturbed wiring network and are part of a network monitoring from the control center, for example. The neighboring addresses, or respectively, all addressable locations in the transmission line from office to subscriber are stored in these information units. The possibility emerges for storing a routing history, installation instructions, and other information about the network and to the environment such as data about temperature, moisture and the like.

The features of the present invention which are believed to be novel, are set forth with particularity as follows.

A method is provided for managing and documenting contact points of a wiring network in an electrical branch apparatus, comprising the steps of inserting electronic information units with storage units at the contact points of the wiring network; inputting retrievable information, that is required for creating a wiring plan to the electronic information units; detecting the electronic information units by address by using a computer; creating a wiring plan with the obtained information; and documenting inputs and outputs of a connection and storing the documentation in the electronic information units as retrievable data. In the inventive method, the electronic information units may be electronic circuits in the form of chips where a power supply of the chips is produced via a line of the wiring network. The inventive method may comprise updating wiring changes in the storage units. Furthermore the generation of the data may be executed at one of a distributor or splitter for communication lines. The electronic information units may be protected by at least one of overvoltage and overcurrent arresters. These units may be connected to the computer by a plugging-on of a plug. The interrogation of the electronic information units may also be wirelessly executed. Communication to the electronic information units in a distributor from a location with a master station may be executed via lines with modulated signal traffic. The frequency range for the signal transmission may be below 10 Hz. Measurement results of connected measuring circuits, can be extracted at the electronic information units.

An embodiment of the inventive method for managing and documenting contact points of a wiring network in an electrical branch apparatus, combines the following steps: inserting electronic information units with storage units at the contact points of the wiring network; inputting retrievable information, that is required for creating a wiring plan to the electronic information units; wirelessly interrogating the electronic information units by address by using a computer; creating a wiring plan with the obtained information; documenting the inputs and outputs of a connection and storing the documentation in the electronic information units as retrievable data; and updating wiring changes in the storage units. In this embodiment, the electronic information units may also be electronic circuits in the form of chips, where a power supply of the chips is produced via a line of the wiring network. The generation of the data here may also be executed at one of a distributor or splitter for communication lines. In this embodiment, the electronic information units may be protected by at least one of overvoltage and overcurrent arresters. Furthermore, in this embodiment, the connection of the electronic information units to the computer may be produced by a plugging-on of a plug.

A final embodiment of the inventive method for managing and documenting contact points of a wiring network in an electrical branch apparatus, comprises the following combination of steps: inserting electronic information units with storage units at the contact points of the wiring network; inputting retrievable information, that is required for creating a wiring plan to the electronic information units; detecting the electronic information units by address by using a computer and communicating with the electronic information units in a distributor from a location with a master station via lines with modulated signal traffic; creating a wiring plan with the obtained information; and documenting the inputs and outputs of a connection and storing the documentation in the electronic information units as retrievable data. In this embodiment, the electronic information units may also be electronic circuits in the form of chips in which a power supply of the chips is produced via a line of the wiring network. Here the wiring changes may also respectively be updated in the storage units. The generation of the data may also be executed at one of a distributor or splitter for communication lines. Finally, the electronic information units in this embodiment may be protected by at least one of overvoltage and overcurrent arresters.

BRIEF DESCRIPTION OF THE DRAWINGS

The invention, together with further objects and advantages, may best be understood by reference to the following description taken in conjunction with the accompanying drawings, in the several Figures of which like reference numerals identify like elements, and in which:

FIG. 3 illustrates an example for remote interrogation; and

FIG. 4 is a block diagram illustrating the Electronic Information Unit and its relationship to other system components.

DESCRIPTION OF THE PREFERRED EMBODIMENTS

Figure 1:
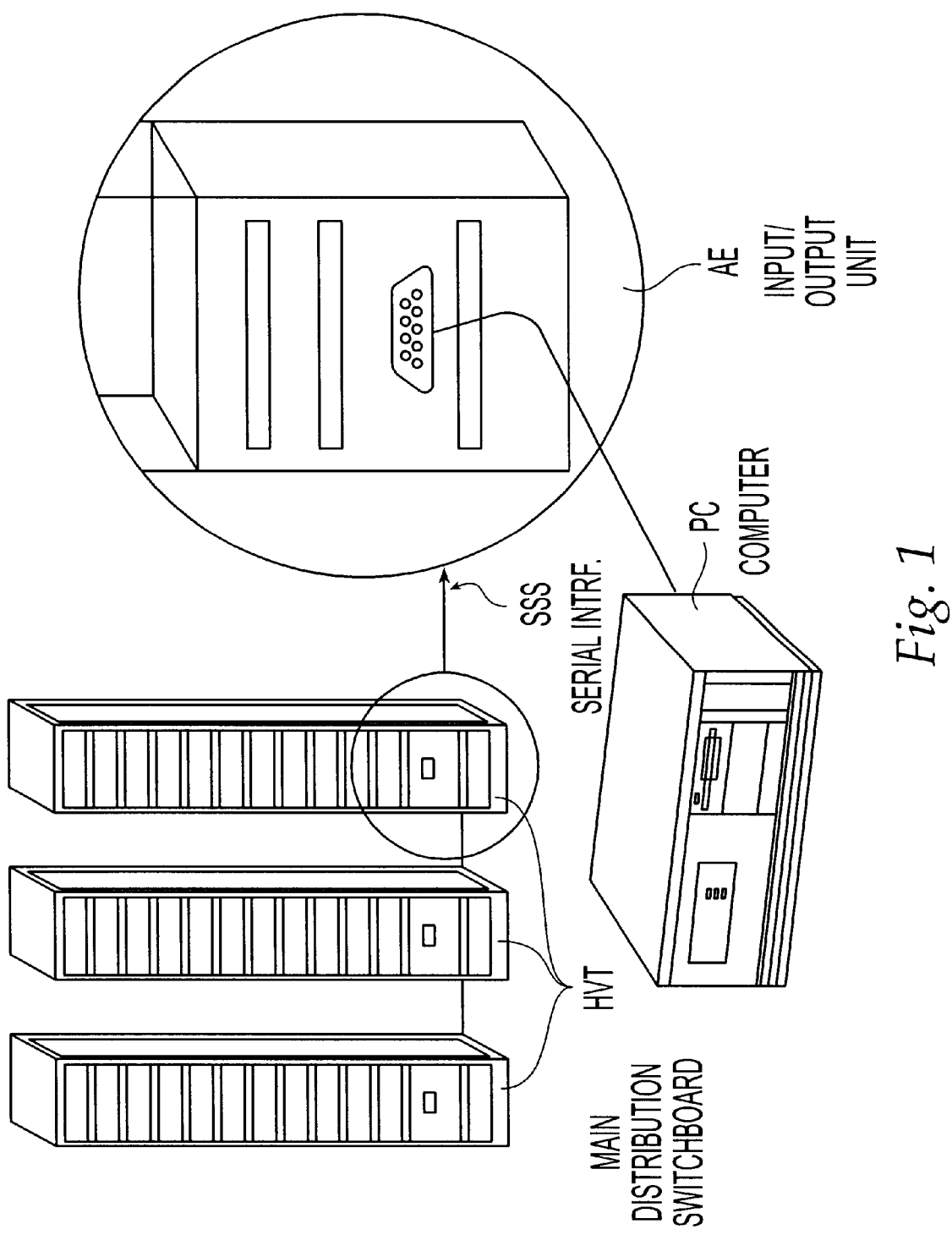
FIG. 1 illustrates an example for a retrieval at a main distribution switchboard

FIG. 1 depicts an arrangement of contact points of a wiring network in the form of main distribution switchboard HVT known per se, these points containing electronic information units (see FIG. 4). Via a serial interface SSS the electronic information units (e.g., in the form of chips) can be retrieved using a computer PC via an input-output unit AE. The described data can now be inputted, stored and read, so that the updated state of the wiring network can be respectively determined via these data.

Figure 2:
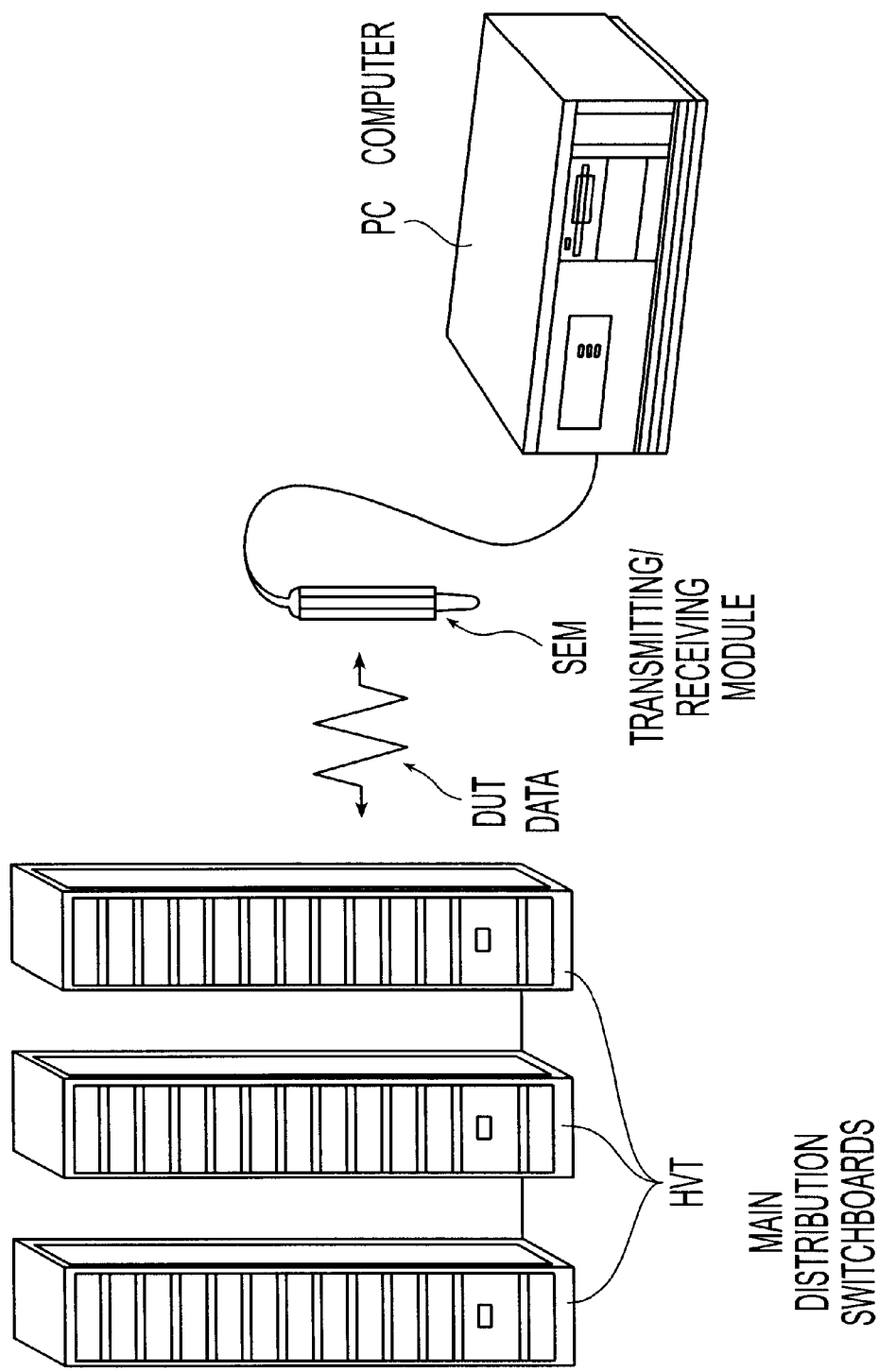
FIG. 2 illustrates an example for a contactless interrogation.

FIG. 2 indicates in outline that the extraction and input of the data required in the wiring network, or respectively, in the main distribution switchboards HVT can also ensue in contactless fashion via a transmitting and receiving module SEM. For example, the transmission of the data DUT ensues with radio or infrared methods, whereby the data are in turn inputted, read and processed by a computer PC. The transmission range is therein relatively low.

FIG. 3 clarifies the transmission of the data DUT between the office A and the main distribution switchboards HVT via the existing lines UT for the communication transmissions, whereby the frequency range for the signal transmission below 10 Hz can also be used. The transmission of the data DUT therein ensues in both directions.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for managing and documenting contact points of a wiring network in an electrical branch apparatus, comprising the steps of:

inserting electronic information units with storage units at the contact points of the wiring network;

inputting retrievable information, that is required for creating a wiring plan to the electronic information units;

detecting the electronic information units by address by using a computer;

creating a wiring plan with the obtained information; and documenting inputs and outputs of a connection and storing the documentation in the electronic information units as retrievable data.

2. The method according to claim 1, wherein the electronic information units are electronic circuits in the form of chips and wherein a power supply of the chips is produced via a line of the wiring network.

3. The method according to claim 1, wherein wiring changes are respectively updated in the storage units.

4. The method according to claim 1, wherein generation of the data is executed at one of a distributor or splitter for communication lines.

5. The method according to claim 1, wherein the electronic information units are protected by at least one of overvoltage and overcurrent arresters.

6. The method according to claim 1, wherein connection of the electronic information units to the computer is produced by a plugging-on of a plug.

7. The method according to claim 1, wherein the interrogation of the electronic information units is wirelessly executed.

8. The method according to claim 1, wherein communication to the electronic information units in a distributor from a location with a master station is executed via lines with modulated signal traffic.

9. The method according to claim 8, wherein a frequency range for the signal transmission is below 10 Hz.

10. The method according to claim 1, wherein measurement results of connected measuring circuits, are extracted at the electronic information units.

11. A method for managing and documenting contact points of a wiring network in an electrical branch apparatus, comprising the steps of:

inserting electronic information units with storage units at the contact points of the wiring network;

inputting retrievable information, that is required for creating a wiring plan to the electronic information units;

wirelessly interrogating the electronic information units by address by using a computer;

creating a wiring plan with the obtained information;

documenting the inputs and outputs of a connection and storing the documentation in the electronic information units as retrievable data; and updating wiring changes in the storage units.

12. The method according to claim 11, wherein the electronic information units are electronic circuits in the form of chips and wherein a power supply of the chips is produced via a line of the wiring network.

13. The method according to claim 11, wherein generation of the data is executed at one of a distributor or splitter for communication lines.

14. The method according to claim 11, wherein the electronic information units are protected by at least one of overvoltage and overcurrent arresters.

15. The method according to claim 11, wherein connection of the electronic information units to the computer is produced by a plugging-on of a plug.

16. A method for managing and documenting contact points of a wiring network in an electrical branch apparatus, comprising the steps of:

inserting electronic information units with storage units are inserted at the contact points of the wiring network;

inputting retrievable information, that is required for creating a wiring plan to the electronic information units;

detecting the electronic information units by address by using a computer and communicating with the electronic information units in a distributor from a location with a master station via lines with modulated signal traffic;

creating a wiring plan with the obtained information; and documenting the inputs and outputs of a connection and storing the documentation in the electronic information units as retrievable data.

17. The method according to claim 16, wherein the electronic information units are electronic circuits in the form of chips and wherein a power supply of the chips is produced via a line of the wiring network.

18. The method according to claim 16, wherein wiring changes are respectively updated in the storage units.

19. The method according to claim 16, wherein generation of the data is executed at one of a distributor or splitter for communication lines.

20. The method according to claim 16, wherein the electronic information units are protected by at least one of overvoltage and overcurrent arresters.

* * * * *